United States Patent
Li

(10) Patent No.: US 11,711,818 B2
(45) Date of Patent: Jul. 25, 2023

(54) METHOD AND DEVICE FOR CONFIGURING TRANSMISSION

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 98 days.

(21) Appl. No.: 17/262,429

(22) PCT Filed: Jul. 25, 2018

(86) PCT No.: PCT/CN2018/097102
§ 371 (c)(1),
(2) Date: Jan. 22, 2021

(87) PCT Pub. No.: WO2020/019217
PCT Pub. Date: Jan. 30, 2020

(65) Prior Publication Data
US 2021/0243794 A1    Aug. 5, 2021

(51) Int. Cl.
H04W 24/10    (2009.01)
H04W 48/08    (2009.01)
(Continued)

(52) U.S. Cl.
CPC .......... *H04W 72/23* (2023.01); *H04W 24/10* (2013.01); *H04W 48/08* (2013.01); *H04W 74/0833* (2013.01); *H04W 76/27* (2018.02)

(58) Field of Classification Search
None
See application file for complete search history.

(56) References Cited

U.S. PATENT DOCUMENTS

2017/0181143 A1* 6/2017 Kim ............... H04L 7/0041
2019/0141693 A1* 5/2019 Guo ............... H04W 72/042
(Continued)

FOREIGN PATENT DOCUMENTS

WO    WO-2019242678 A1 * 12/2019 ........... H04L 5/0053

OTHER PUBLICATIONS

Extended European Search Report dated Jul. 12, 2021 in corresponding European Patent Application No. 18928078.7, 14 pages.
(Continued)

*Primary Examiner* — Ajit Patel
*Assistant Examiner* — Liem H. Nguyen
(74) *Attorney, Agent, or Firm* — Oblon, McClelland, Maier & Neustadt, L.L.P.

(57) ABSTRACT

The present disclosure provides a method for configuring transmission. Configuration information for synchronization signal and physical broadcast channel block SSB measurement sent by a base station can be received. An SSB measurement is performed based on the configuration information for SSB measurement to obtain an SSB measurement report. The SSB measurement report is sent to the base station through a first designated message in order to allow the base station to configure a set of transmission configuration indication TCI states for the terminal based on the SSB measurement report. The first designated message is configured to represent contention solution during a random access procedure.

16 Claims, 17 Drawing Sheets

(51) Int. Cl.
*H04W 74/08* (2009.01)
*H04W 76/27* (2018.01)
*H04W 72/23* (2023.01)

(56) References Cited

U.S. PATENT DOCUMENTS

| | | | |
|---|---|---|---|
| 2019/0268053 A1* | 8/2019 | Wilson et al. | H04W 24/10 |
| 2020/0280409 A1* | 9/2020 | Grant | H04W 72/042 |
| 2021/0029730 A1* | 1/2021 | Lou | H04W 72/14 |
| 2021/0119688 A1* | 4/2021 | Enescu | H04L 5/0048 |
| 2022/0216955 A1* | 7/2022 | Kim | H04L 1/1864 |

OTHER PUBLICATIONS

Ericsson, "On beam indication, measurement, and reporting", 3GPP TSG-RAN WG1 NR Ad Hoc #3, R1-1716350, XP051329939, Sep. 18-21, 2017, pp. 1-13.

Nokia et al., "NR 4-step RACH procedure", 3GPP TSG RAN WG1 NR Ad-Hoc#2, R1-1710892, XP051300093, Jun. 27-30, 2017, pp. 1-9.

International Search Report dated May 6, 2019 in PCT/CN2018/097102 (submitting English translation only), 2 pages.

* cited by examiner

US 11,711,818 B2

METHOD AND DEVICE FOR CONFIGURING TRANSMISSION

CROSS-REFERENCE TO RELATED APPLICATION(S)

The present application is a 371 application of International Patent Application No. PCT/CN2018/097102, filed on Jul. 25, 2018, the disclosure of which is incorporated herein by reference in its entirety.

TECHNICAL FIELD

Embodiments of the present disclosure relate to a field of communication technology, including to a method and an apparatus for configuring transmission.

BACKGROUND

In a new generation of communication system, beam-based transmission and reception are required in order to ensure the coverage range due to faster high-frequency channel attenuates. A process for managing the beam starts after a terminal completes random access and RRC (Radio Resource Control) connection with a base station.

SUMMARY

Embodiments of the present disclosure provide a method for configuring transmission, which is applied to a terminal. The method can include receiving configuration information for SSB measurement sent by a base station, performing the SSB measurement based on the configuration information for SSB measurement in order to obtain an SSB measurement report, and ending the SSB measurement report to the base station through a first designated message, to allow the base station to configure a set of TCI states for the terminal based on the SSB measurement report, in which the first designated message is configured to represent contention resolution during a random access procedure.

Exemplary embodiments of the present disclosure further provides a method for configuring transmission is provided that can be applied to a base station. The method can include setting configuration information for SSB measurement for a terminal, sending the configuration information for SSB measurement to the terminal, to allow the terminal to perform SSB measurement based on the configuration information for SSB measurement to obtain an SSB measurement report, and configuring a set of TCI states for the terminal based on the SSB measurement report in response to receiving the SSB measurement report sent from the terminal through a first designated message, in which the first designated message is configured to represent contention resolution during a random access procedure.

Further exemplary embodiments of the present disclosure can provide a device for configuring transmission that can be integrated to a terminal. The device can include a processor and a memory that is configured to store instructions executable by the processor. The processor can be configured to perform operations including receiving configuration information for SSB measurement sent by a base station, and performing the SSB measurement based on the configuration information for SSB measurement, to obtain an SSB measurement report. The processor can be further configured to send the SSB measurement report to the base station through a first designated message, to allow the base station to configure a set of TCI states for the terminal based on the SSB measurement report, in which the first designated message is configured to represent contention resolution during a random access procedure.

It should be understood that the above general description and the following detailed description are only exemplary and explanatory, and should not limit the present disclosure.

BRIEF DESCRIPTION OF THE DRAWINGS

The drawings herein are incorporated into the specification and constitute a part of the specification, show embodiments in accordance with the disclosure and are used to explain the principle of the present invention together with the specification.

DETAILED DESCRIPTION

Figure 1:
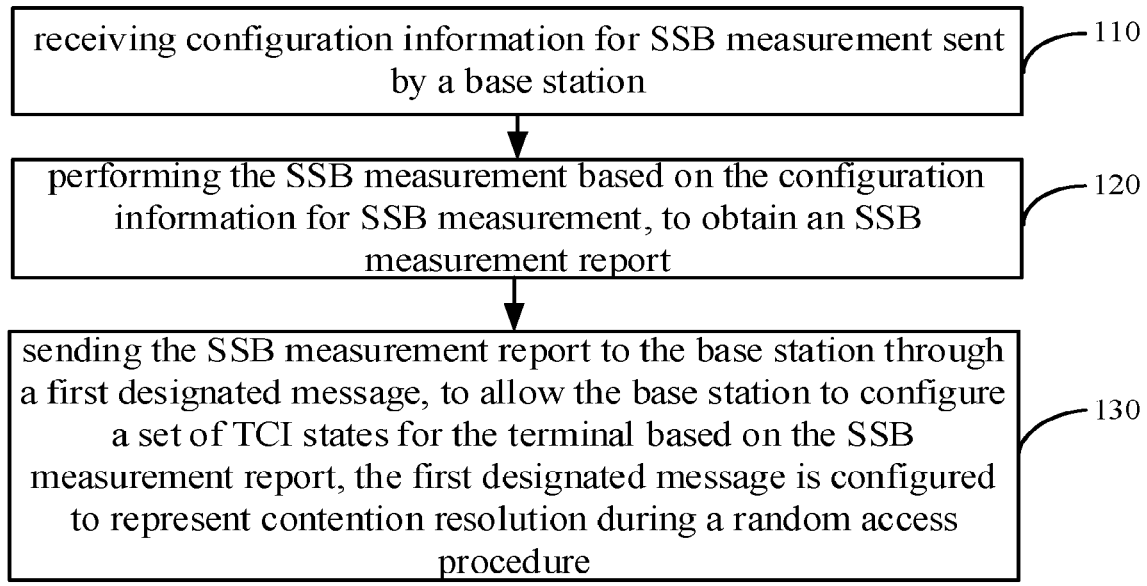
FIG. 1 is a flowchart illustrating a method for configuring transmission according to an example embodiment.

Exemplary embodiments will be described in detail here, and examples thereof are shown in the accompanying drawings. When the following description refers to the drawings, unless otherwise indicated, the same numbers in different drawings indicate the same or similar elements. The implementation manners described in the following example embodiments do not represent all implementation manners consistent with the present disclosure. Rather, they are only apparatuses and methods consistent with some aspects of the present disclosure as detailed in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms such as first, second and third may be used in this disclosure to describe various information, these information should not be limited to these terms. These terms are only used to distinguish the same type of information from each other. For example, without departing from the scope of the present disclosure, indication information may also be referred to as a second information, and similarly, the second information may also be referred to as indication information. Depending on the context, the word "if" as used herein may be interpreted as "when" or "upon" or "in response to determination".

In a new generation of communication system, beam-based transmission and reception are required in order to ensure the coverage range due to faster high-frequency channel attenuates. In the related art, a process for managing the beam starts after a terminal completes random access and RRC (Radio Resource Control) connection with a base station. However, after the random access is completed, the base station has to wait for a process including a beam measurement configuration, a beam measurement, and a beam measurement report before configuring a set of TCI (Transmission Configuration Indication) states for the terminal, thereby increasing the delay of configuring the TCI, so that the terminal may not use the most suitable receiving beam in time, which further affects the throughput of the terminal.

Therefore, embodiments of the disclosure provide a method and a device for configuring transmission.

The terminal of the present disclosure may receive configuration information for SSB measurement sent by a base station, perform the SSB measurement based on the configuration information for SSB measurement to obtain an SSB measurement report, send the SSB measurement report to the base station through a first designated message, in which the first designated message is configured to represent contention resolution during a random access procedure. In this way, the base station is allowed to configure a set of TCI states for the terminal based on the SSB measurement report in the first designated message, thereby improving the efficiency of configuring transmission and reducing time delay.

The base station of the present disclosure may configure the set of TCI states for the terminal based on the SSB measurement report after receiving the SSB measurement report sent from the terminal through the first designated message, thereby improving the efficiency of configuring transmission and reducing time delay.

Figure 2:
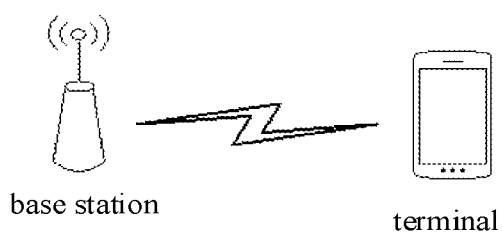
FIG. 2 is a schematic diagram illustrating an application scenario of a method for configuring transmission according to an example embodiment.

FIG. 1 is a flowchart illustrating a method for configuring transmission according to an example embodiment. FIG. 2 is a schematic diagram illustrating an application scenario of a method for configuring transmission according to an example embodiment. The method for configuring transmission may be executed by a terminal. The terminal may be a UE (user equipment). As illustrated in FIG. 1, the method for configuring transmission may include the following blocks 110-130.

At block 110, configuration information for synchronization signal and physical broadcast channel block SSB measurement sent by a base station is received. In some embodiments of the present disclosure, the configuration information for SSB measurement may be configured by the base station for the terminal to perform the SSB measurement. The configuration information for SSB measurement may be sent to the terminal through a designated message. For example, the designated message may be a system message.

In some embodiments, the block 110 may be implemented by the following. An SIB (System Information Block) 1 sent by the base station is received. The SIB1 includes the configuration information for SSB measurement. In some embodiments, the configuration information for SSB measurement includes the following.

(1-1) A measured object, including one or more SSBs designated by the base station.

(1-2) A measurement triggering condition, including a designated measurement triggering threshold. The designated measurement triggering threshold may be a designated SSB received power threshold or an L1-RSRP (Layer 1-Reference Signal Received Power) threshold; or the designated measurement triggering threshold may be a designated SSB received quality threshold or an L1-RSRQ (Reference Signal Received Quality) threshold.

(1-3) A configuration of the measurement report, including a designated content of the measurement report, or a designated content and a designated transmission resource of the measurement report. The designated content of the measurement report may be: an SSB identifier plus L1-RSRP and/or L1-RSRQ. The designated transmission resource may be a PUCCH (Physical Uplink Control Channel) resource or a PUSCH (Physical Uplink Shared Channel) resource.

In the above (1-3), the base station may or may not configure a designated transmission resource for the measurement report. If the base state does not configure the designated transmission resource, the resource configured by the base station for the terminal for transmitting the first designated message (that is the message (Msg.3) for representing contention resolution during a random access procedure) may be directly reused. The resource for transmitting the Msg.3 may be the PUCCH resource or the PUSCH resource.

At block 120, the SSB measurement is performed based on the configuration information for SSB measurement to obtain an SSB measurement report.

At block 130, the SSB measurement report is sent to the base station through a first designated message, to allow the base station to configure a set of transmission configuration indication TCI states for the terminal based on the SSB measurement report. The first designated message is configured to represent contention resolution during a random access procedure.

In some embodiments of the present disclosure, when the SSB measurement report is sent to the base station through the first designated message, a corresponding manner may be used depending on whether the base station configures the designated transmission resource for the measurement report.

In Manner 1, the configuration of the measurement report does not include the designated transmission resource of the measurement report. In this manner, the specific implementation can include the following.

(2-1) The first designated resource configured by the base station for transmitting the first designated message (Msg.3) by the terminal is determined.

(2-2) The SSB measurement report is added to the first designated message (Msg.3).

(2-3) The first designated resource is used to send the first designated message (Msg.3) carrying the SSB measurement report to the base station.

It may be seen from the above Manner 1 that, when the configuration of the measurement report does not include the designated transmission resource of the measurement report, the first designated resource for transmitting the first designated message (Msg.3) may be directly reused to send the first designated message (Msg.3) carrying the SSB measurement report to the base station.

In Manner 2, the configuration of the measurement report includes the designated transmission resource of the measurement report, and the designated transmission resource is different from the resource for transmitting the Msg.3. In this manner, the specific implementation includes the following.

(3-1) A second designated resource configured by the base station for transmitting the first designated message (Msg.3) by the terminal is determined.

(3-2) When the second designated resource is different from the designated transmission resource, a C-RNTI (Cell Radio Network Temporary Identifier) that is the same as the first designated message (Msg.3) is obtained.

In some embodiments of the present disclosure, a C-RNTI may be included in a random access feedback received by the terminal during the random access procedure. The C-RNTI is a dynamic identifier assigned by the base station to the terminal. The base station may configure the resource for sending the Msg.3 for the terminal, so that the terminal may send the Msg.3 including the C-RNTI on the resource for sending the Msg.3.

(3-3) The SSB measurement report is sent to the base station using the C-RNTI and the designated transmission resource.

It may be seen from the Manner 2 that, although the SSB measurement report is not included in the first designated message (Msg.3), the C-RNTI that is the same as the first designated message (Msg.3) is used.

In Manner 3, the configuration of the measurement report can include the designated transmission resource of the measurement report, and the designated transmission resource is the same as the resource for transmitting the Msg.3.

(4-1) A second designated resource configured by the base station for transmitting the first designated message (Msg.3) by the terminal is determined.

(4-2) When the second designated resource is the same as the designated transmission resource, the SSB measurement report is added to the first designated message.

(4-3) The first designated message carrying the SSB measurement report is sent to the base station using the second designated resource.

It may be seen from the above Manner 3 that, when the configuration of the measurement report includes the designated transmission resource of the measurement report and the designated transmission resource is the same as the resource for transmitting the Msg.3, the second designated resource for transmitting the first designated message (Msg.3) may also be directly reused to send the first designated message (Msg.3) carrying the SSB measurement report to the base station.

Figure 3:
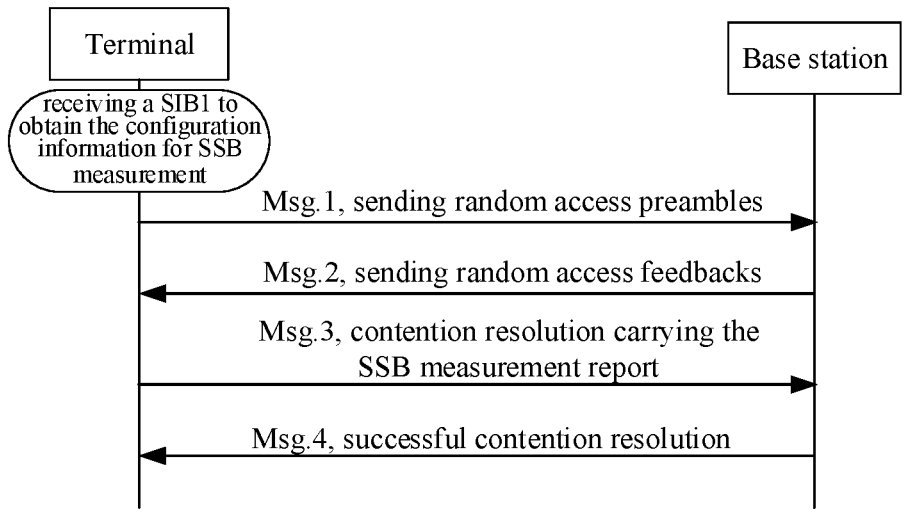
FIG. 3 is a schematic diagram illustrating a transmission configuration according to an example embodiment.

In an instance scenario, as illustrated in FIG. 2, a base station and a terminal are included. The base station may set configuration information for SSB measurement for the terminal, and send the configuration information for SSB measurement to the terminal. After receiving the configuration information for SSB measurement sent by the base station, the terminal may perform the SSB measurement based on the configuration information for SSB measurement to obtain the SSB measurement report. The terminal may send the SSB measurement report to the base station through the first designated message, to allow the base station to configure the set of TCI states for the terminal based on the SSB measurement report. The first designated message is configured to represent the contention resolution during the random access procedure. The first designated message is the Msg.3 as illustrated in FIG. 3.

It may be seen from the above embodiments that, by receiving the configuration information for SSB measurement sent by the base station, the SSB measurement is performed based on the configuration information for SSB measurement to obtain the SSB measurement report. By sending the SSB measurement report to the base station through the first designated message, the base station may configure the set of TCI states for the terminal based on the SSB measurement report. The first designated message is configured to represent the contention resolution during the random access procedure. In this way, the efficiency of configuring transmission may be improved and the time delay may be reduced.

Figure 4:
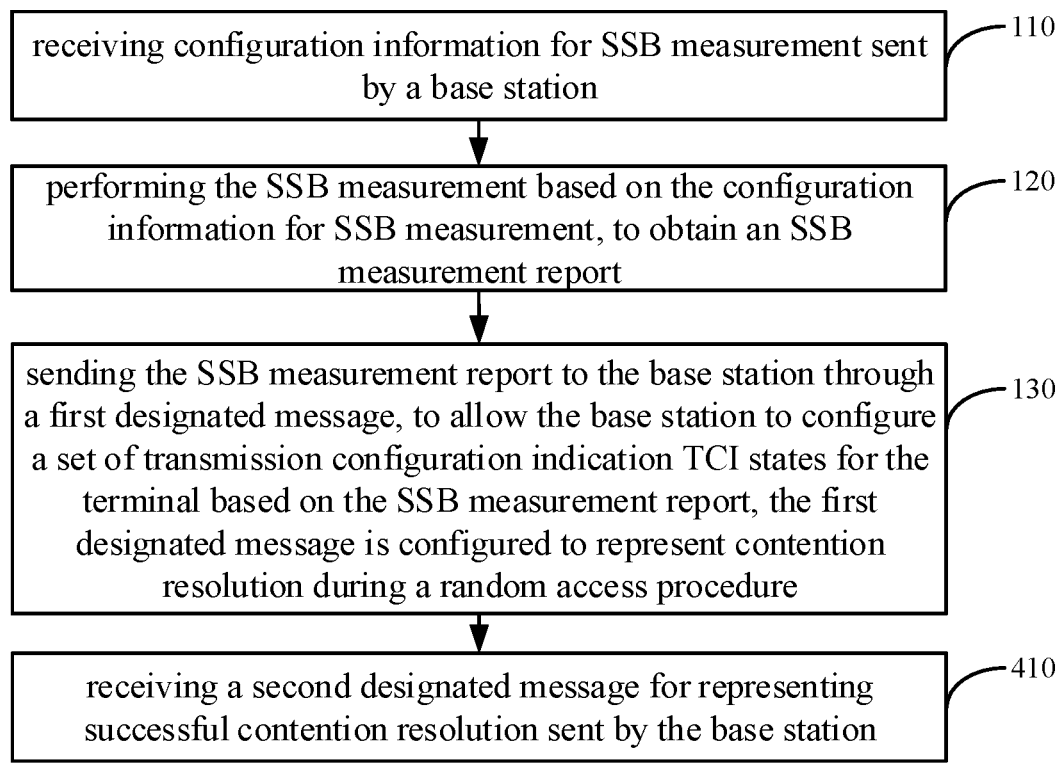
FIG. 4 is a flowchart illustrating another method for configuring transmission according to an example embodiment.

FIG. 4 is a flowchart illustrating another method for configuring transmission according to an example embodiment. The method for configuring transmission may be executed by a terminal and is based on the method illustrated in FIG. 1. As illustrated in FIG. 4, the method for configuring transmission may further include the following block 410.

At block 410, a second designated message (such as, the Msg.4 illustrated in FIG. 3) for representing a successful contention resolution sent by the base station is received. In some embodiments of the present disclosure, through the second designated message, the base station sends the PDSCH (Physical Downlink Shared Channel) carrying a contention resolution identifier to the terminal. The terminal obtains that the random access is successful.

Figure 5:
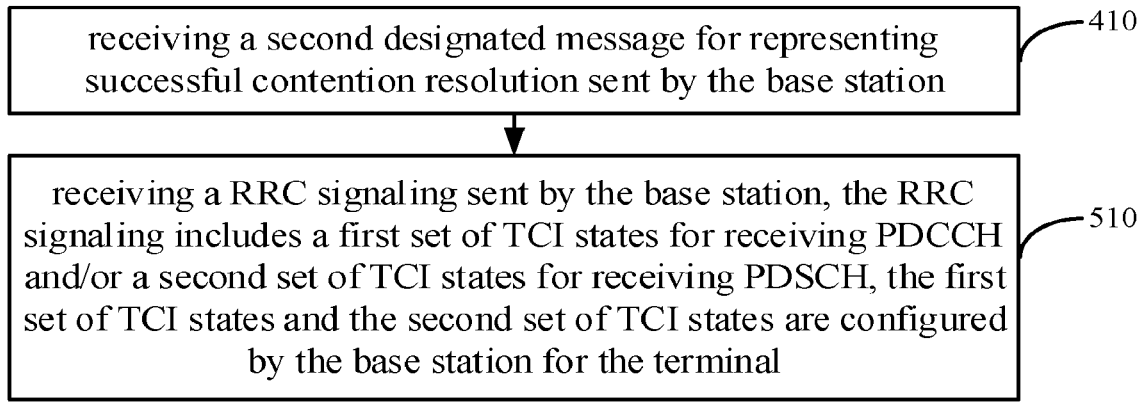
FIG. 5 is a flowchart illustrating another method for configuring transmission according to an example embodiment.

In some embodiments, while or after performing the block 410, as illustrated in FIG. 5, the method for configuring transmission may further include the following block 510. At block 510, a RRC signaling sent by the base station is received. The RRC signaling includes a first set of TCI (Transmission Configuration Indication) states for receiving PDCCH (Physical Downlink Control Channel) and/or a second set of TCI states for receiving PDSCH. The first set of TCI states and the second set of TCI states are configured by the base station for the terminal. The first set of TCI states include first correspondences, and each first correspondence is between an SSB identifier and a TCI state identifier for receiving PDCCH. The second set of TCI states include second correspondences, and each second correspondence is between an SSB identifier and a TCI state identifier for receiving PDSCH.

In some embodiments, receiving PDCCH refers to transmitting physical downlink control channel data on the PDCCH, such as schedule information, downlink control information DCI. Further, the first correspondence may refer to a correspondence between a TCI state identifier for receiving PDCCH and an SSB identifier. In addition, a QCL (quasi co-location) type corresponding to the TCI state identifier for receiving PDCCH is D type that is configured for a spatial Rx parameter (i.e., the beam indication).

The second correspondence may refer to a correspondence between a TCI state identifier for receiving PDSCH and an SSB identifier. In addition, a QCL (quasi co-location) type corresponding to the TCI state identifier for receiving PDCCH is D type that is configured for a spatial Rx parameter (i.e., the beam indication).

The base station may send the RRC signaling carrying the first set of TCI states and/or the second set of TCI states while sending the second designated message. Further, the base station may send the RRC signaling carrying the first set of TCI states and/or the second set of TCI states after sending the second designated message. Therefore, the terminal may receive the RRC signaling carrying the first set of TCI states and/or the second set of TCI states while receiving the second designated message. Further, terminal may receive the RRC signaling carrying the first set of TCI states and/or the second set of TCI states after receiving the second designated message.

In addition, the first set of TCI states or the second set of TCI states configured by the base station for the terminal may include only one TCI state identifier or multiple TCI state identifiers. In a case that only one TCI state identifier is included, the terminal may directly use a receiving beam that is also used for receiving the SSB designated by or corresponding to the SSB identifier corresponding to the TCI state identifier in receiving the PDCCH or the PDSCH. In a case that multiple TCI state identifiers are included, the terminal also needs to receive the TCI state identifier that is activated or indicated again by the base station, in receiving the PDCCH or the PDSCH (see embodiments illustrated in FIG. 6 and FIG. 7).

It may be seen from the above embodiments that, while or after receiving the second designated message sent by the base station, the RRC signaling sent by the base station is received. The second designated message represents the successful contention resolution. The RRC signaling includes the first set of TCI states for receiving PDCCH and/or the second set of TCI states for receiving PDSCH. The first and second set of TCI states are configured by the base station for the terminal. Therefore, the reliability of receiving the first and second sets of TCI state may be improved and the time delay may be reduced.

Figure 6:
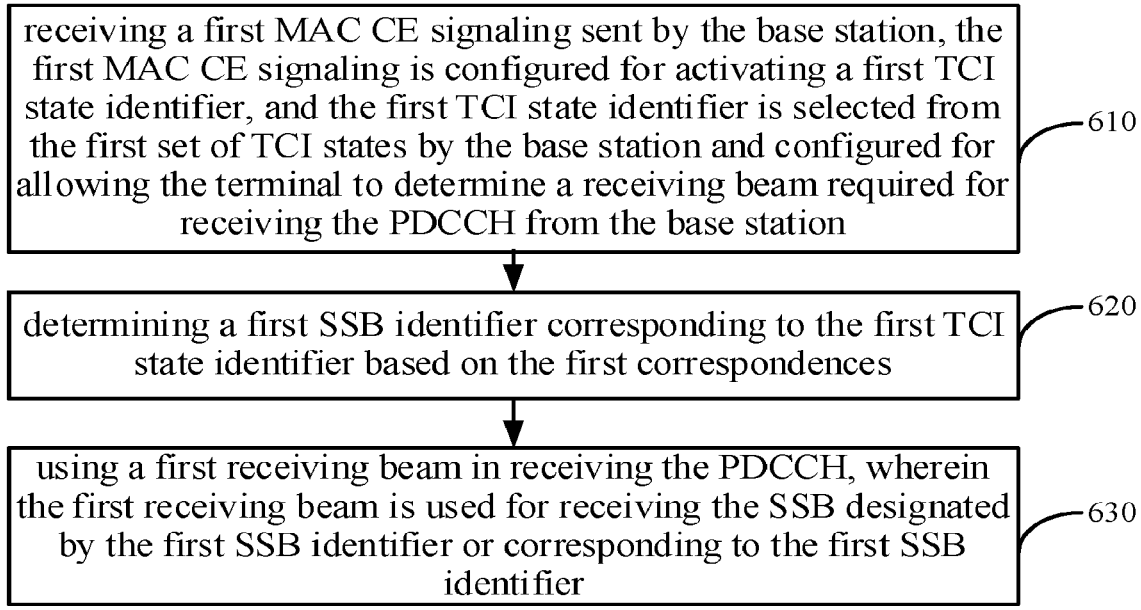
FIG. 6 is a flowchart illustrating another method for configuring transmission according to an example embodiment.

FIG. 6 is a flowchart illustrating another method for configuring transmission according to an example embodiment. The method for configuring transmission may be executed by a terminal and is based on the method illustrated in FIG. 5. The first set of TCI states includes at least two TCI state identifiers. As illustrated in FIG. 6, the method for configuring transmission may further include the following blocks 610-630.

At block 610, a first media access control MAC control element CE signaling sent by the base station is received. The first MAC CE signaling is configured for activating a first TCI state identifier. One TCI state identifier included in the first set of TCI states is selected by the base station as the first TCI state identifier. The first TCI state identifier is configured for allowing the terminal to determine a receiving beam required for receiving the PDCCH from the base station.

In some embodiments of the present disclosure, the first MAC CE signaling is configured to activate the first TCI state identifier. For example, the first set of TCI states includes 64 TCI state identifiers, and the base station may select one of the 64 TCI state identifiers as the first TCI state identifier.

At block 620, a first SSB identifier corresponding to the first TCI state identifier is determined based on the first correspondences. The first correspondences are included in the first set of TCI states.

At block 630, a first receiving beam is used in receiving the PDCCH. The first receiving beam is also used for receiving the SSB designated by the first SSB identifier or corresponding to the first SSB identifier.

It may be seen from the above embodiments that, the first MAC CE signaling sent by the base station is received. The first MAC CE signaling is configured for activating the first TCI state identifier. The first TCI state identifier is selected from the first set of TCI states by the base station. The first SSB identifier corresponding to the first TCI state identifier is determined based on the first correspondences. The first receiving beam that is used for receiving the SSB designated by the first SSB identifier or corresponding to the first SSB identifier is used in receiving the PDCCH. Therefore, the transmission configuration for receiving the PDCCH is allowed and reliability of this transmission configuration is improved.

Figure 7:
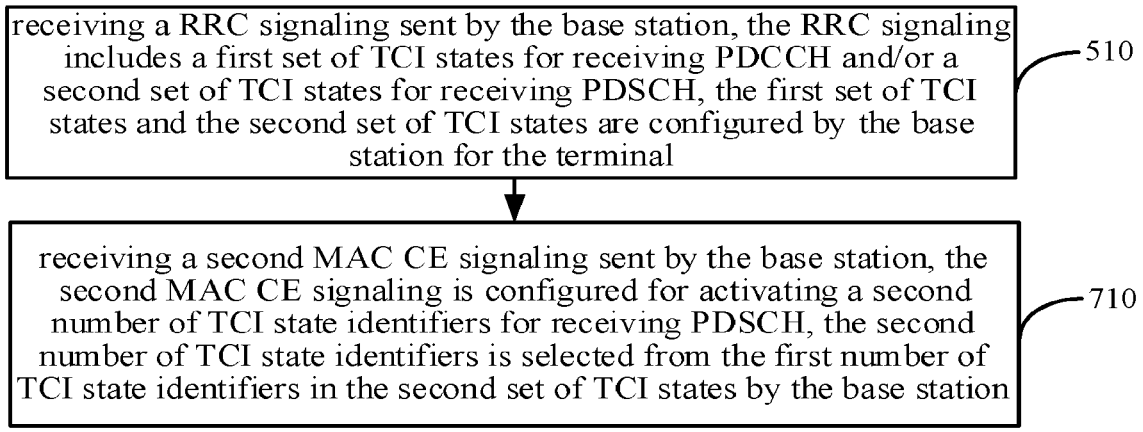
FIG. 7 is a block diagram illustrating another method for configuring transmission according to an example embodiment.

FIG. 7 is a flowchart illustrating another method for configuring transmission according to an example embodiment. The method for configuring transmission may be executed by a terminal and is based on the method illustrated in FIG. 5. The second set of TCI states includes a first number of TCI state identifiers, where the first number is greater than 1. As illustrated in FIG. 7, the method for configuring transmission may further include the following block 710.

At block 710, a second MAC CE signaling sent by the base station is received. The second MAC CE signaling is configured for activating a second number of TCI state identifiers for receiving PDSCH. The second number of TCI state identifiers is selected from the first number of TCI state identifiers in the second set of TCI states by the base station.

In some embodiments of the present disclosure, the second number is less than the first number. For example, the first number is 64 and the second number is 8. For the PDSCH, the base station may select 8 TCI state identifiers from 64 TCI state identifiers and notify the same to the terminal through the second MAC CE signaling.

It may be seen from the above embodiments that, the second MAC CE signaling sent by the base station is received. The second MAC CE signaling is configured for activating the second number of TCI state identifiers for receiving PDSCH. The second number of TCI state identifiers is selected from the first number of TCI state identifiers in the second set of TCI states by the base station. Therefore, the transmission configuration for receiving PDSCH may be allowed and the reliability of this transmission configuration may be improved.

Figure 8:
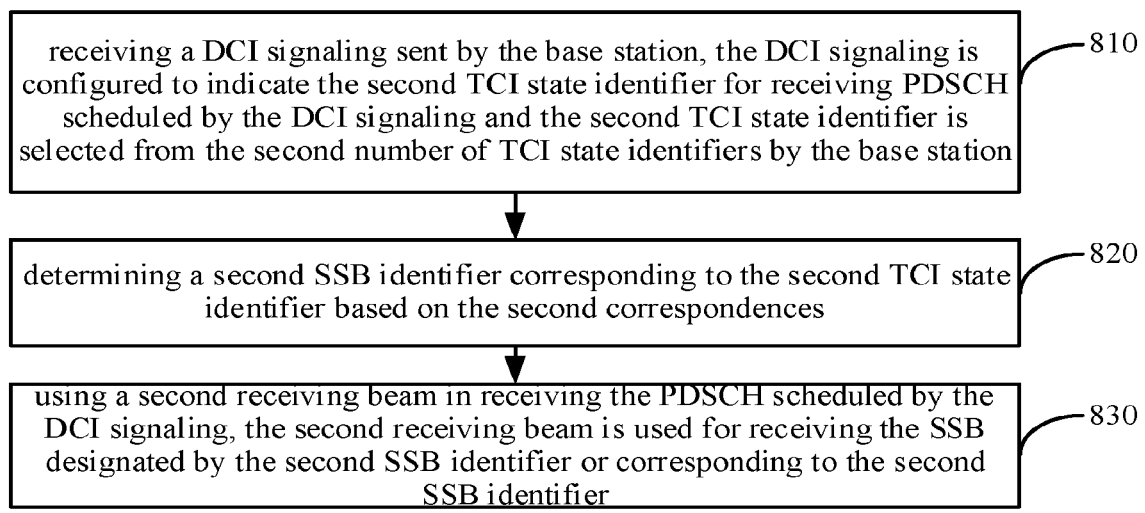
FIG. 8 is a block diagram illustrating another method for configuring transmission according to an example embodiment.

FIG. 8 is a flowchart illustrating another method for configuring transmission according to an example embodiment. The method for configuring transmission may be executed by a terminal and is based on the method illustrated in FIG. 7, where the second number is greater than one. As illustrated in FIG. 8, the method for configuring transmission may further include the following blocks 810-830.

At block 810, a DCI (Downlink Control Information) signaling sent by the base station is received. The DCI signaling is configured to indicate the second TCI state identifier for receiving PDSCH scheduled by the DCI signaling. The second TCI state identifier is selected from the second number of TCI state identifiers by the base station.

In some embodiments of the present disclosure, the second number is greater than 1. For example, the second number is 8. The base station may select one of the eight TCI state identifiers as the second TCI state identifier.

At block 820, the second SSB identifier corresponding to the second TCI state identifier is determined based on the second correspondences. The second correspondences are included in the second set of TCI states.

At block 830, a second receiving beam is used in receiving the PDSCH scheduled by the DCI signaling. The second receiving beam is also used for receiving the SSB designated by the second SSB identifier or corresponding to the second SSB identifier.

It may be seen from the above embodiments that, the DCI signaling sent by the base station is received. The DCI signaling is configured to indicate the second TCI state identifier for receiving PDSCH scheduled by the DCI signaling. The second TCI state identifier is selected from the second number of TCI state identifiers by the base station. The second SSB identifier corresponding to the second TCI state identifier is determined based on the second correspondences. The second receiving beam is used in receiving the PDSCH scheduled by the DCI signaling and the second receiving beam is also used for receiving the SSB designated by the second SSB identifier or corresponding to the second SSB identifier. Therefore, the transmission configuration for receiving the PDSCH scheduled by the DC signaling may be allowed and the reliability of this transmission configuration may be improved.

Figure 9:
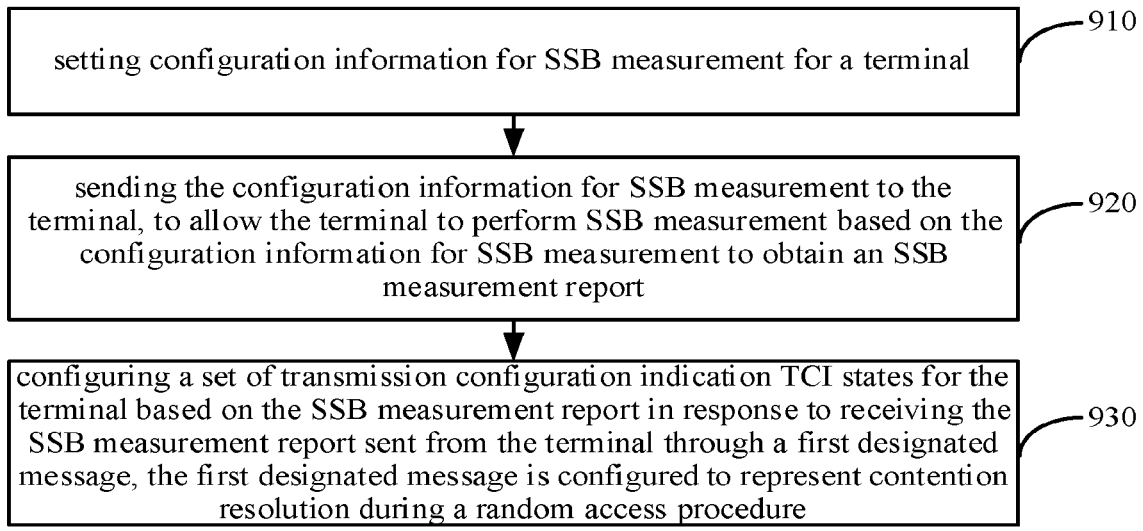
FIG. 9 is a block diagram illustrating a method for configuring transmission according to an example embodiment.

FIG. 9 is a flowchart illustrating a method for configuring transmission according to an example embodiment. The method for configuring transmission may be executed by a base station. As illustrated in FIG. 9, the method for configuring transmission may include the following blocks 910-930.

At block 910, configuration information for SSB measurement is set for a terminal. In some embodiments of the present disclosure, the configuration information for SSB measurement may be configured by the base station for the terminal to perform an SSB measurement.

In some embodiments, the configuration information for SSB measurement includes the following.

(1-1) A measured object, including one or more SSBs designated by the base station.

(1-2) A measurement triggering condition, including a designated measurement triggering threshold.

(1-3) A configuration of the measurement report, including a designated content of the measurement report, or a designated content and a designated transmission resource of the measurement report. The designated transmission resource may be a PUCCH resource or a PUSCH resource.

In the above (1-3), the base station may or may not configure the designated transmission resource for the measurement report. If the base station does not configure the designated transmission resource, the resource configured by the base station for the terminal to transmit the first designated message (that is the message (Msg. 3) for representing contention resolution during a random access procedure) may be directly reused. The resource for transmitting the Msg.3 may be the PUCCH resource or the PUSCH resource.

At block 920, the configuration information for SSB measurement is sent to the terminal to allow the terminal to perform the SSB measurement based on the configuration information for SSB measurement to obtain an SSB measurement report.

In some embodiments of the present disclosure, the base station may send the configuration information for SSB measurement to the terminal through a designated message. For example, the designated message is a system message.

In some embodiments, the block 920 may be performed by the following.

The configuration information for SSB measurement is added to SIB1 and the SIB1 is sent to the terminal.

At block 930, in response to receiving the SSB measurement report sent by the terminal through the first designated message, the set of TCI states are configured for the terminal based on the SSB measurement report. The first designated message is configured to represent a contention resolution during a random access procedure. For example, the base station determines a TCI state based on the SSB measurement report, such as TCI #0 corresponding to SSB #i. A QCL (Quasi-co-location) type corresponding to TCI #0 is D type that is configured for a spatial Rx parameter (i.e., the beam indication). The set of TCI states may be shown in Table 1.

TABLE 1

| TCI states | reference signal identifiers | QCI types | notes |
|---|---|---|---|
| TCI#0 | SSB#i | D type | Informing the terminal by the base station that TCI#0 is used means that the base station informs the terminal that the beam used in receiving the SSB#i used to receive the PDCCH or PDSCH |
| TCI#1 | SSB#J | D type | |
| ... | ... | ... | |
| ... | ... | ... | |
| ... | ... | ... | |

In some embodiments, the set of TCI states configured by the base station for the terminal may include a first set of TCI states for receiving PDCCH and/or a second set of TCI states for receiving PDSCH. The block 930 of configuring the set of TCI states for the terminal based on the SSB measurement report may be implemented by the following.

The first set of TCI states for receiving PDCCH and/or the second set of TCI states for receiving PDSCH are configured for the terminal based on the SSB measurement report. The first set of TCI states includes first correspondences and each first correspondence is between a TCI state identifier for receiving PDCCH and an SSB identifier. The second set of TCI states includes second correspondences and each second correspondence is between a TCI state identifier for receiving PDSCH and an SSB identifier.

The first correspondence may refer to a correspondence between an SSB identifier and a TCI state identifier for receiving PDCCH. In addition, the QCL (quasi co-location) type corresponding to the TCI state identifier for receiving PDCCH is D type that is configured for a spatial Rx parameter (i.e., the beam indication). See Table 1 for details.

The second correspondence may refer to a correspondence between an SSB identifier and a TCI state identifier for receiving PDSCH. In addition, a QCL (quasi co-location) type corresponding to the TCI state identifier for receiving PDCCH is D type that is configured for a spatial Rx parameter (i.e., the beam indication). See Table 1 for details.

It may be seen from the above embodiments that, after receiving the SSB measurement report sent by the terminal through the first designated message, the set of TCI states may be configured for the terminal based on the SSB measurement report.

Therefore, the efficiency of configuring transmission may be improved and time delay may be reduced.

Figure 10:
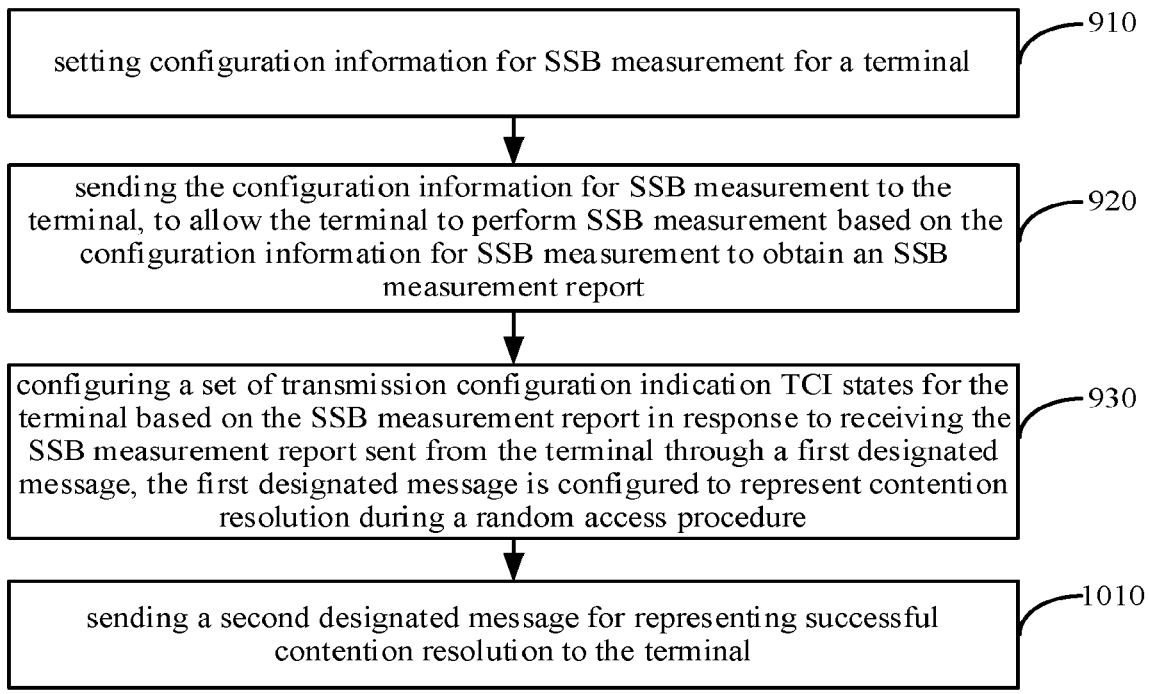
FIG. 10 is a block diagram illustrating another method for configuring transmission according to an example embodiment.

FIG. 10 is a flowchart illustrating another method for configuring transmission according to an example embodiment. The method for configuring transmission may be executed by a base station and is based on the method illustrated in FIG. 9. As illustrated in FIG. 10, the method for configuring transmission may also include the following block 1010.

Figure 11:
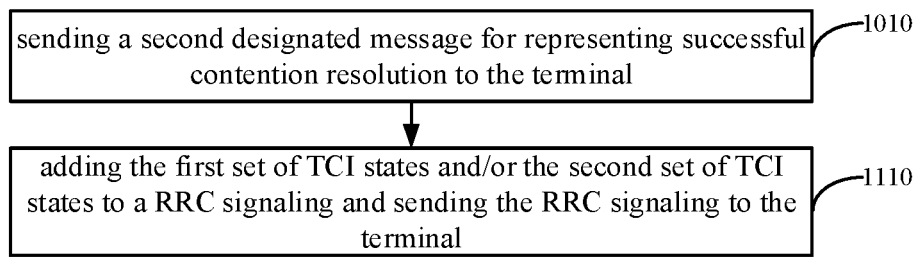
FIG. 11 is a block diagram illustrating another method for configuring transmission according to an example embodiment.

At block 1010, a second designated message (such as, the Msg. 4 illustrated in FIG. 3) for representing a successful contention resolution is sent to the terminal. In some embodiments, while or after performing the block 1010, as illustrated in FIG. 11, the method for configuring transmission may further include the following block 1110.

At block 1110, the first set of TCI states and/or the second set of TCI states are added to a RRC signaling, and the RRC signaling is sent to the terminal.

It may be seen from the above embodiments that, while or after sending the second designated message for representing the successful contention resolution to the terminal, the first set of TCI states and/or the second set of TCI states may be added to the RRC signaling, and the RRC signaling may be sent to the terminal. Therefore, the reliability of transmitting the first and second sets of TCI states may be improved and time delay may be reduced.

Figure 12:
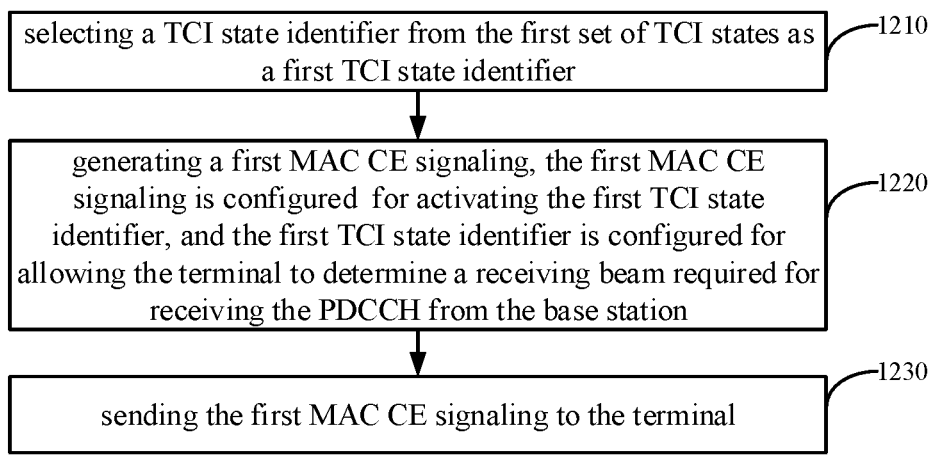
FIG. 12 is a block diagram illustrating another apparatus for transmitting information according to an example embodiment.

FIG. 12 is a flowchart illustrating another method for configuring transmission according to an example embodiment. The method for configuring transmission may be executed by a base station and is based on the method illustrated in FIG. 11. The first set of TCI states includes at least two TCI state identifiers. As illustrated in FIG. 12, the method for configuring transmission may further include the following blocks 1210-1230.

At block 1210, a TCI state identifier is selected from the first set of TCI states as a first TCI state identifier.

At block 1220, a first MAC CE signaling is generated. The first MAC CE signaling is configured for activating the first TCI state identifier. The first TCI state identifier is configured for allowing the terminal to determine a receiving beam required for receiving the PDCCH from the base station.

At block 1230, the first MAC CE signaling is sent to the terminal.

It may be seen from the above embodiments that, by selecting the first TCI state identifier from the first set of TCI states and by activating the first TCI state identifier through the first MAC CE signaling, the first TCI state identifier allows the terminal to receive the PDCCH from the base station. Therefore, the transmission configuration used for receiving the PDCCH may be allowed and the reliability of the transmission configuration may be improved.

Figure 13:
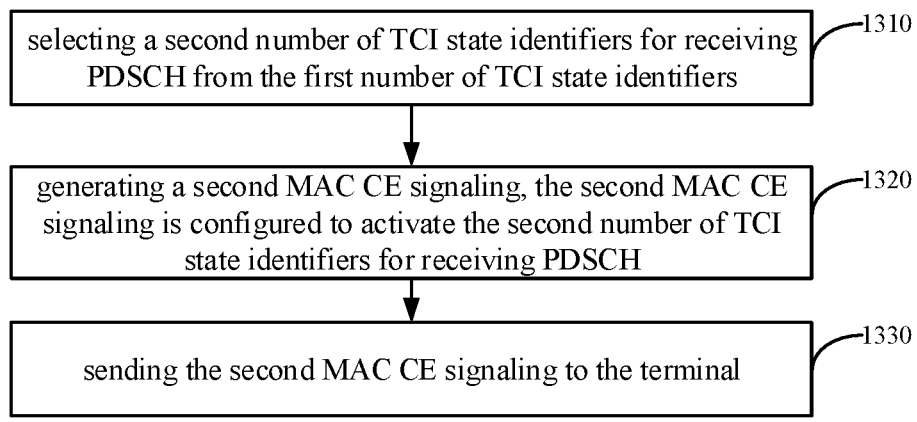
FIG. 13 is a block diagram illustrating another method for configuring transmission according to an example embodiment.

FIG. 13 is a flowchart illustrating another method for configuring transmission according to an example embodiment. The method for configuring transmission may be executed by a base station and is based on the method illustrated in FIG. 11. The second set of TCI states includes a first number of TCI state identifiers, where the first number is greater than 1. As illustrated in FIG. 13, the method for configuring transmission may further include the following blocks 1310-1330.

At block 1310, a second number of TCI state identifiers for receiving PDSCH are selected from the first number of TCI state identifiers in the second set of TCI states.

At block 1320, a second MAC CE signaling is generated. The second MAC CE signaling is configured for activating the second number of TCI state identifiers for receiving PDSCH.

At block 1330, the second MAC CE signaling is sent to the terminal.

It may be seen from the above embodiments that, the second number of TCI state identifiers for receiving PDSCH are selected from the first number of TCI state identifiers. The second MAC CE signaling is generated. The second MAC CE signaling is configured to activate the second number of TCI state identifiers for receiving PDSCH. The second MAC CE signaling is sent to the terminal. Therefore, the transmission configuration for receiving the PDSCH may be allowed and the reliability of this transmission configuration may be improved.

Figure 14:
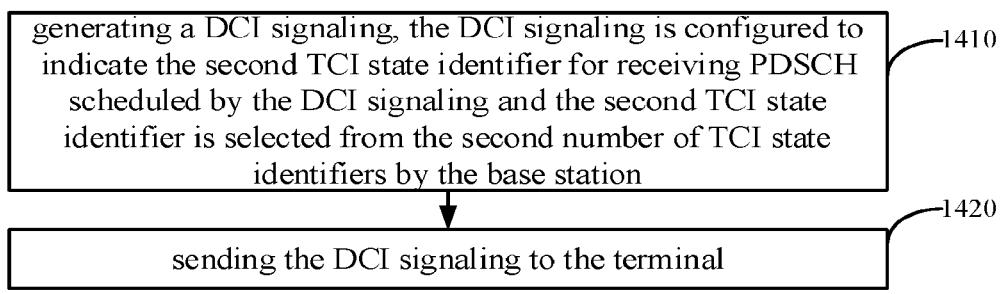
FIG. 14 is a block diagram illustrating another method for configuring transmission according to an example embodiment.

FIG. 14 is a flowchart illustrating another method for configuring transmission according to an example embodiment. The method for configuring transmission may be executed by a base station and is based on the method illustrated in FIG. 13, where the second number is greater than 1. As illustrated in FIG. 14, the method for configuring transmission may further include the following blocks 1410-1420.

At block 1410, a DCI signaling is generated. The DCI signaling is configured to indicate the second TCI state identifier for receiving PDSCH scheduled by the DCI. The second TCI state identifier is selected from the second number of TCI state identifiers by the base station.

At block 1420, the DCI signaling is sent to the terminal.

It may be seen from the above embodiments that, the DCI signaling is generated. The DCI signaling is configured to indicate the second TCI state identifier for receiving PDSCH scheduled by the DCI signaling. The second TCI state identifier is selected from the second number of TCI state identifiers by the base station. The DCI signaling is sent to the terminal. Therefore, the transmission configuration for receiving PDSCH scheduled by the DCI signaling may be allowed and the reliability of the transmission configuration may be improved.

Corresponding to the foregoing embodiments of the method for configuring transmission, the present disclosure also provides embodiments of an apparatus for configuring transmission.

Figure 15:
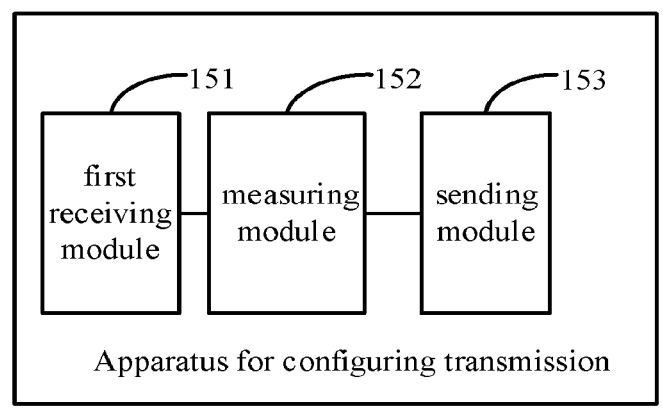
FIG. 15 is a block diagram illustrating an apparatus for configuring transmission according to an example embodiment.

FIG. 15 is a block diagram illustrating an apparatus for configuring transmission according to an example embodiment. The apparatus may be a terminal or integrated into a terminal. The terminal may be a UE and used to execute the method for configuring transmission illustrated in FIG. 1. As illustrated in FIG. 15, the apparatus for configuring transmission may include a first receiving module 151, a measuring module 152 and a sending module 153. Of course, it should be understood that one or more of the modules described in this specification can be implemented by hardware, such as circuitry.

The first receiving module 151 is configured to receive configuration information for SSB measurement sent by a base station.

The measuring module 152 is configured to perform the SSB measurement based on the configuration information for SSB measurement, to obtain an SSB measurement report.

The sending module 153 is configured to send the SSB measurement report to the base station through a first designated message, to allow the base station to configure a set of TCI states for the terminal based on the SSB measurement report, in which the first designated message is configured to represent contention resolution during a random access procedure.

It may be seen from the above embodiment that, configuration information for SSB measurement sent by a base station is received, the SSB measurement is performed based on the configuration information for SSB measurement to obtain an SSB measurement report, and the SSB measurement report is sent to the base station through a first designated message configured to represent contention resolution during a random access procedure. In this way, the base station may be allowed to configure a set of TCI states for the terminal based on the SSB measurement report, thereby improving the efficiency of configuring transmission and reducing time delay.

Figure 16:
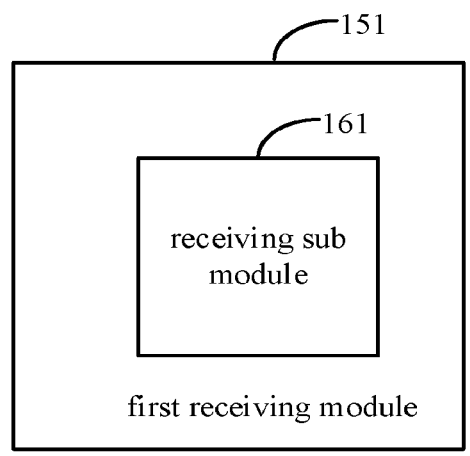
FIG. 16 is a block diagram illustrating another apparatus for configuring transmission according to an example embodiment.

In some embodiments based on the apparatus illustrated in FIG. 15, as illustrated in FIG. 16, the first receiving module 151 may include a receiving sub module 161. The receiving sub module 161 is configured to receive a system message block SIB1 sent by the base station, the SIB1 including the configuration information for SSB measurement.

In some embodiments based on the apparatus illustrated in FIG. 15, the configuration information for SSB measurement can include a measured object including one or more SSBs designated by the base station, a measurement triggering condition including a designated measurement triggering threshold, and a configuration of the measurement report including a designated content of the measurement report.

Figure 17:
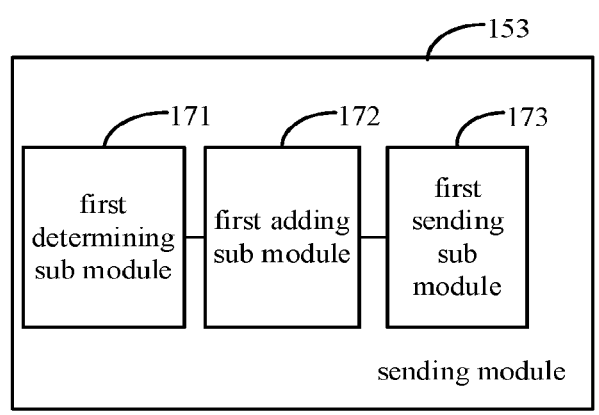
FIG. 17 is a block diagram illustrating another apparatus for configuring transmission according to an example embodiment.

In some embodiments based on the apparatus illustrated in FIG. 15, as illustrated in FIG. 17, the sending module 153 may include a first determining sub module 171, a first adding sub module 172 and a first sending sub module 173. The first determining sub module 171 is configured to determine a first designated resource configured by the base station for the terminal for transmitting the first designated message. The first adding sub module 172 is configured to add the SSB measurement report to the first designated message. The first sending sub module 173 is configured to send the first designated message carrying the SSB measurement report to the base station with the first designated resource.

Figure 18:
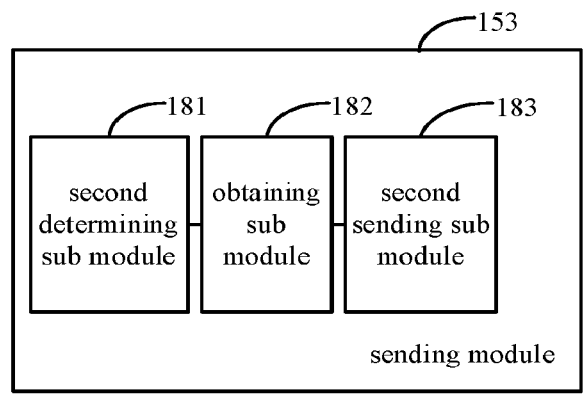
FIG. 18 is a block diagram illustrating another apparatus for configuring transmission according to an example embodiment.

In some embodiments based on the apparatus illustrated in FIG. 15, the configuration of the measurement report can further include a designated transmission resource of the measurement report, and as illustrated in FIG. 18, the sending module 153 may include a second determining sub module 181, an obtaining sub-module 182 and a second sending sub module 183. The second determining sub module 181 is configured to determine a second designated resource configured by the base station for the terminal for transmitting the first designated message. The obtaining sub-module 182 is configured to obtain a C-RNTI in response to the second designated resource being different from the designated transmission resource, in which the C-RNTI is the same as the first designated message. The second sending sub module 183 is configured to send the SSB measurement report to the base station with the C-RNTI and the designated transmission resource.

Figure 19:
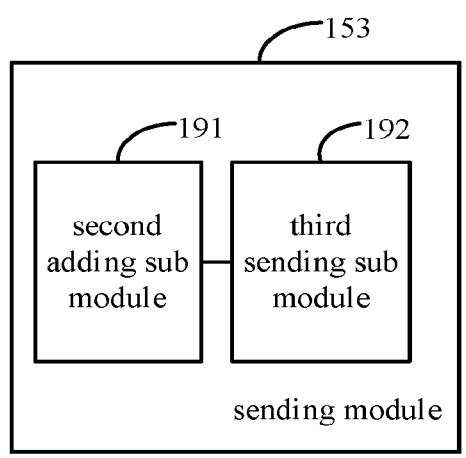
FIG. 19 is a block diagram illustrating another apparatus for configuring transmission according to an example embodiment.

In some embodiments based on the device apparatus in FIG. 18, as illustrated in FIG. 19, the sending module 153 may further include a second adding sub module 191 and a third sending sub module 192. The second adding sub module 191 is configured to add the SSB measurement report to the first designated message in response to the second designated resource being the same as the designated transmission resource. The third sending sub module 192 is configured to send the first designated message carrying the SSB measurement report to the base station with the second designated resource.

Figure 20:
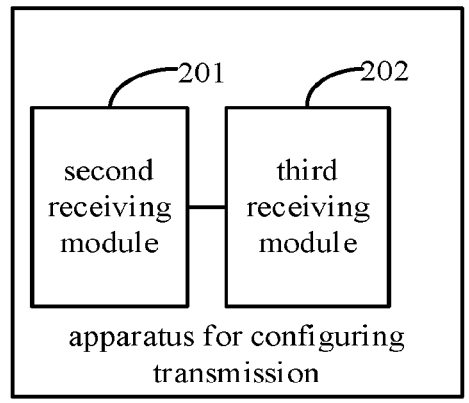
FIG. 20 is a block diagram illustrating another apparatus for configuring transmission according to an example embodiment.

In some embodiment based on the apparatus illustrated in FIG. 15, as illustrated in FIG. 20, the apparatus may further include a second receiving module 201 and a third receiving module 202.

The second receiving module 201 is configured to receive a second designated message for representing successful contention resolution sent by the base station.

The third receiving module 202 is configured to receive a RRC signaling sent by the base station, in which the RRC signaling includes a first set of TCI states for receiving PDCCH and/or a second set of TCI states for receiving PDSCH, the first set of TCI states and the second set of Ti states are configured by the base station for the terminal, the first set of TCI states include first correspondences, each first correspondence is between a TCI state identifier for receiving PDCCH and an SSB identifier, the second set of TCI states include second correspondences, and each second correspondence is between a TCI state identifier for receiving PDSCH and an SSB identifier.

It may be seen from the above embodiments that, while or after receiving the second designated message for representing successful contention resolution sent by the base station, the RRC signaling sent by the base station is received, in which the RRC signaling includes a first set of TCI states for receiving PDCCH and/or a second set of TCI states for receiving PDSCH, the first set of TCI states and the second set of TC states are configured by the base station for the terminal, thereby improving the reliability of receiving the set of TCI states and avoiding time delay.

Figure 21:
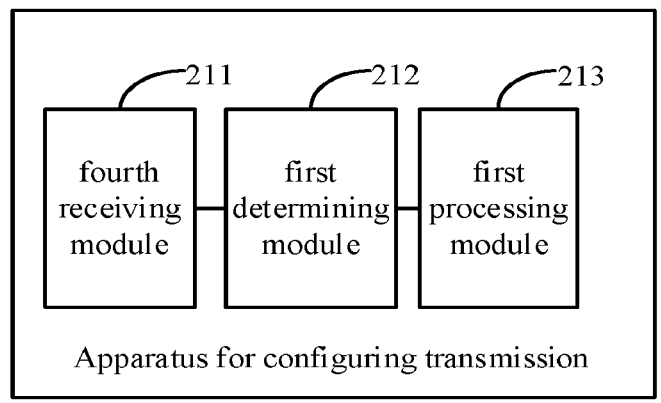
FIG. 21 is a block diagram illustrating another apparatus for configuring transmission according to an example embodiment.

In some embodiments based on the apparatus illustrated in FIG. 20, the first set of TCI states include at least two TCI state identifiers; and as illustrated in FIG. 21, the apparatus may further include a fourth receiving module 211, a first determining module 212 and a first processing module 213.

The fourth receiving module 211 is configured to receive a first MAC CE signaling sent by the base station, in which the first MAC CE signaling is configured for activating a first TCI state identifier, and the first TCI state identifier is selected from the first set of TCI states by the base station and configured for allowing the terminal to determine a receiving beam required for receiving the PDCCH from the base station.

The first determining module 212 is configured to determine a first SSB identifier corresponding to the first TCI state identifier based on the first correspondences.

The first processing module 213 is configured to use a first receiving beam in receiving the PDCCH, in which the first receiving beam is also used for receiving the SSB designated by the first SSB identifier or corresponding to the first SSB identifier.

It may be seen from the above embodiments that, the first MAC CE signaling sent by the base station is received, in which the first MAC CE signaling is configured for activating a first TCI state identifier, and the first TCI state identifier is selected from the first set of TCI states by the base station: the first SSB identifier corresponding to the first TCI state identifier is determined based on the first correspondences; and the first receiving beam is used in receiving the PDCCH, in which the first receiving beam is also used for receiving the SSB designated by the first SSB identifier or corresponding to the first SSB identifier, thereby achieving the transmission configuration for receiving the PDCCH and also improving the reliability of this transmission configuration.

Figure 22:
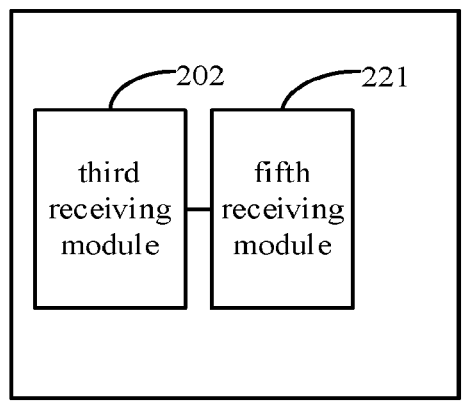
FIG. 22 is a block diagram illustrating another apparatus for configuring transmission according to an example embodiment.

In some embodiments based on the apparatus illustrated in FIG. 20, the second set of TCI states include a first number of TCI state identifiers in which the first number is greater than 1, and as illustrated in FIG. 22, the apparatus may further include a fifth receiving module 221.

The fifth receiving module 221 is configured to receive a second MAC CE signaling sent by the base station, in which the second MAC CE signaling is configured for activating a second number of TCI state identifiers for receiving PDSCH, in which the second number of TCI state identifiers is selected from the first number of TCI state identifiers in the second set of TCI states by the base station.

It may be seen from the above embodiments that, the second MAC CE signaling sent by the base station is received, in which the second MAC CE signaling is configured for activating a second number of TCI state identifiers for receiving PDSCH, in which the second number of TCO state identifiers is selected from the first number of TCI state identifiers in the second set of TCI states by the base station, thereby achieving the transmission configuration for receiving PDSCH and also improving the reliability of this transmission configuration.

Figure 23:
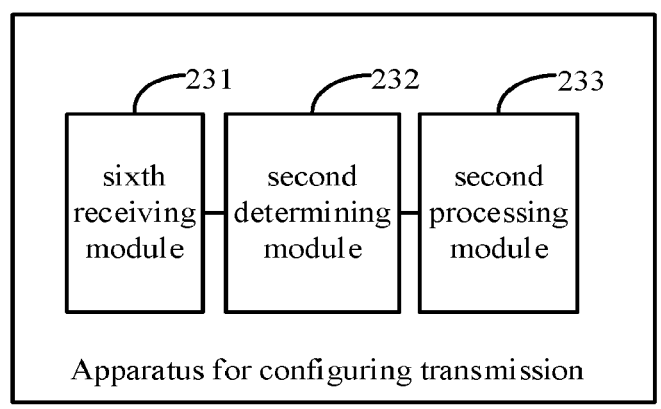
FIG. 23 is a block diagram illustrating another apparatus for configuring transmission according to an example embodiment.

In some embodiments based on the apparatus illustrated in FIG. 22, where the second number is greater than 1, as illustrated in FIG. 23, the apparatus may further include a sixth receiving module 231, a second determining module 232 and a second processing module 233.

The sixth receiving module 231 is configured to receive a DCI signaling sent by the base station, in which the DCI signaling is configured to indicate the second TCI state identifier for receiving PDSCH scheduled by the DCI signaling and the second TCI state identifier is selected from the second number of TCI state identifiers by the base station.

The second determining module 232 is configured to determine a second SSB identifier corresponding to the second TCI state identifier based on the second correspondences.

The second processing module 233 is configured to use a second receiving beam in receiving the PDSCH scheduled by the DCI signaling, in which the second receiving beam is also used for receiving the SSB designated by the second SSB identifier or corresponding to the second SSB identifier.

It may be seen from the above embodiments that, the DCI signaling sent by the base station is received, in which the DCI signaling is configured to indicate the second TC state identifier for receiving PDSCH scheduled by the DCI signaling and the second TC state identifier is selected from the second number of TCI state identifiers by the base station; the second SSB identifier corresponding to the second TCI state identifier is determined based on the second correspondences; and the second receiving beam is used in receiving the PDSCH scheduled by the DCI signaling, in which the second receiving beam is also used for receiving the SSB designated by the second SSB identifier or corresponding to the second SSB identifier, thereby achieving the transmission configuration for receiving the PDSCH scheduled by the DC signaling scheduling, and also improving the reliability of this transmission configuration.

Figure 24:
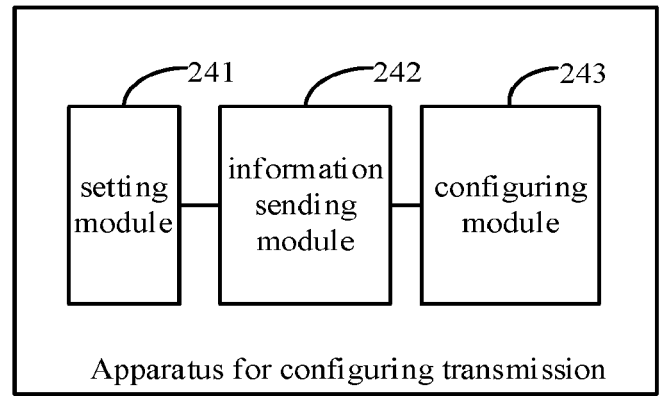
FIG. 24 is a block diagram illustrating an apparatus for configuring transmission according to an example embodiment.

FIG. 24 is a block diagram illustrating an apparatus for configuring transmission according to an example embodiment. The apparatus is a base station or integrated in a base state. As illustrated in FIG. 24, the apparatus for configuring transmission may include a setting module 241, an information sending module 242 and a configuring module 243. The setting module 241 is configured to set configuration information for SSB measurement for a terminal. The information sending module 242 is configured to send the configuration information for SSB measurement to the terminal, to allow the terminal to perform SSB measurement based on the configuration information for SSB measurement to obtain an SSB measurement report. The configuring module 243 is configured to configure a set of TCI states for the terminal based on the SSB measurement report in response to receiving the SSB measurement report sent from the terminal through a first designated message, in which the first designated message is configured to represent contention resolution during a random access procedure.

It may be seen from the above embodiments that, after receiving the SSB measurement report sent from the terminal through the first designated message, the set of TCI states may be configured for the terminal based on the SSB measurement report, thereby improving the efficiency of configuring transmission and reducing time delay.

Figure 25:
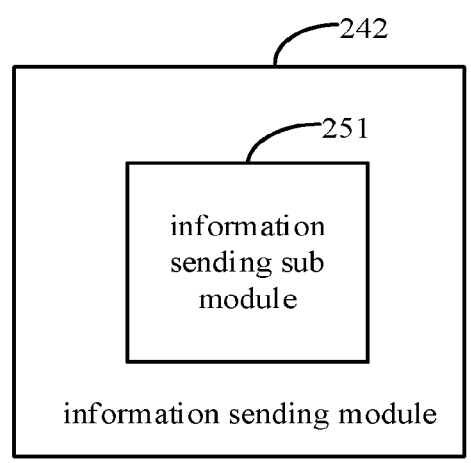
FIG. 25 is a block diagram illustrating another apparatus for configuring transmission according to an example embodiment.

In some embodiments based on the apparatus illustrated in FIG. 24, as illustrated in FIG. 25, the information sending module 242 may include an information sending sub module 251. The information sending sub module 251 is configured to add the configuration information for SSB measurement to a SIB1 and send the SIB1 to the terminal.

In some embodiments based on the apparatus illustrated in FIG. 24, the configuration information for SSB measurement can include a measured object including one or more SSBs designated, a measurement triggering condition including a designated measurement triggering threshold, and a configuration of the measurement report including a designated content of the measurement report, or a designated content and a designated transmission resource of the measurement report.

Figure 26:
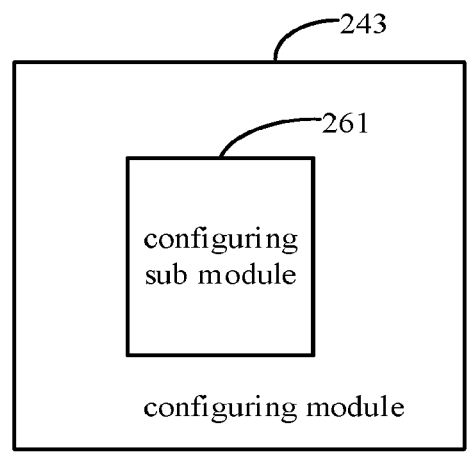
FIG. 26 is a block diagram illustrating another apparatus for configuring transmission according to an example embodiment.

In some embodiments based on the apparatus illustrated in FIG. 24, as illustrated in FIG. 26, the configuring module 243 may include a configuring sub module.

The configuring sub module is configured to configure a first set of TCI states for receiving PDCCH and/or a second set of TCI states for receiving PDSCH for the terminal based on the SSB measurement report, in which the first set of TCI states include first correspondences, each first correspondence is between a TCI state identifier for receiving PDCCH and an SSB identifier, the second set of TCI states include second correspondences, and each second correspondence is between a TCI state identifier for receiving PDSCH and an SSB identifier.

Figure 27:
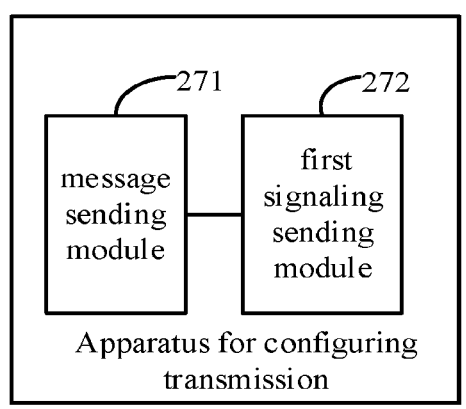
FIG. 27 is a block diagram illustrating another apparatus for configuring transmission according to an example embodiment.

In some embodiments based on the apparatus illustrated in FIG. 26, as illustrated in FIG. 27, the apparatus may further include a message sending module 271 and a first signaling sending module 272. The message sending module 271 is configured to send a second designated message for representing successful contention resolution to the terminal. The first signaling sending module 272 is configured to add the first set of TCI states and/or the second set of TCI states to a RRC signaling and sending the RRC signaling to the terminal.

It may be seen from the above embodiments that, while or after sending the second designated message for representing successful contention resolution to the terminal, the first set of TCI states and/or the second set of TCI states may be added to the RRC signaling, and the RRC signaling is sent to the terminal, thereby improving the reliability of transmitting the set of TCI states and avoiding time delay.

Figure 28:
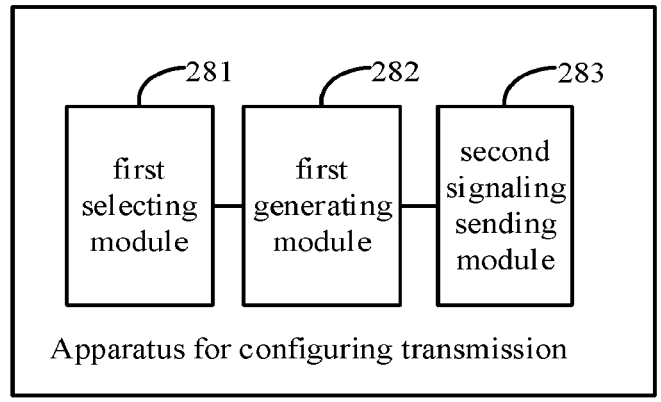
FIG. 28 is a block diagram illustrating another apparatus for configuring transmission according to an example embodiment.

In some embodiments based on the apparatus illustrated in FIG. 27, the first set of TCI states include at least two TCI state identifiers. As illustrated in FIG. 28, the apparatus may further include a first selecting module 281, a first generating module 282 and a second signaling sending module 283.

The first selecting module 281 is configured to select a TCI state identifier from the first set of TCI states as a first TCI state identifier. The first generating module 282 is configured to generate a first MAC CE signaling, in which the first MAC CE signaling is configured for activating the first TCI state identifier, and the first TCI state identifier is configured for allowing the terminal to determine a receiving beam required for receiving the PDCCH from the base station. The second signaling sending module 283 is configured to send the first MAC CE signaling to the terminal.

It may be seen from the above embodiments that, the first TCI state identifier is selected from the first set of TCI states and is activated by the first MAC CE signaling, to allow the terminal to receive the PDCCH from the base station, thereby achieving The transmission configuration used for PDCCH reception is also improved, and the reliability of the transmission configuration is also improved.

Figure 29:
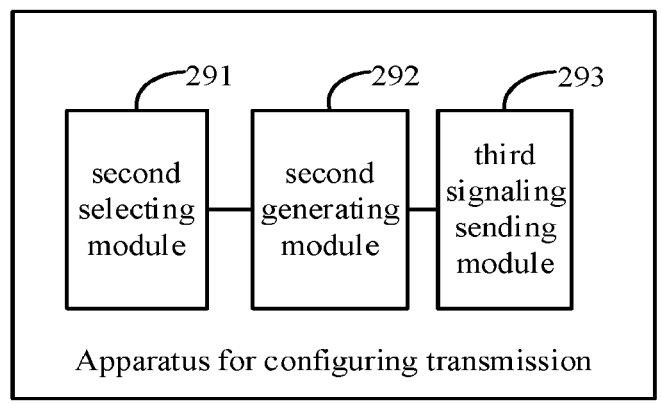
FIG. 29 is a block diagram illustrating another apparatus for configuring transmission according to an example embodiment.

In some embodiment based on the apparatus illustrated in FIG. 27, the second set of TCI states include a first number of TCI state identifiers in which the first number is greater than 1. As illustrated in FIG. 29, the apparatus may further include a second selecting module 291, a second generation module 292 and a third signaling sending module 293. The second selecting module 291 is configured to select a second number of TCI state identifiers for receiving PDSCH from the first number of TCI state identifiers. The second generation module 292 is configured to generate a second MAC CE signaling, in which the second MAC CE signaling is configured to activate the second number of TCI state identifiers to receive the PDSCH. The third signaling sending module 293 is configured to send the second MAC CE signaling to the terminal.

It may be seen from the above embodiments that, the second number of TCI state identifiers for receiving PDSCH are selected from the first number of TCI state identifiers, the second MAC CE signaling is generated, in which the second MAC CE signaling is configured to activate the second number of TCI state identifiers to receive the PDSCH, and the second MAC CE signaling are sent to the terminal, thereby achieving the transmission configuration for receiving the PDSCH and improving the reliability of this transmission configuration.

Figure 30:
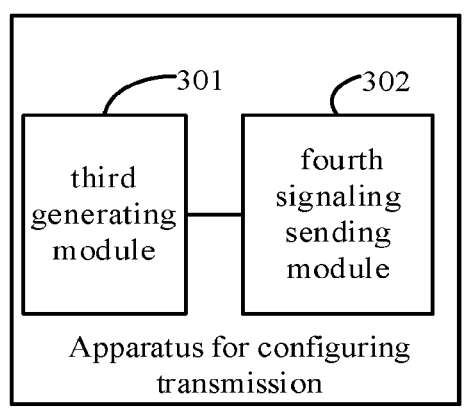
FIG. 30 is a block diagram illustrating another apparatus for configuring transmission according to an example embodiment.

In some embodiment based on the apparatus illustrated in FIG. 29, where the second number is greater than 1, as illustrated in FIG. 30, the apparatus may further include a third generating module 301 and a fourth signaling sending module 302.

The third generating module 301 is configured to generate a DCI signaling, in which the DCI signaling is configured to indicate the second TCI state identifier for receiving PDSCH scheduled by the DCI signaling and the second TCI state identifier is selected from the second number of TCI state identifiers by the base station; and The fourth signaling sending module 302 is configured to send the DCI signaling to the terminal.

It may be seen from the above embodiments that, the DCI signaling is generated, in which the DCI signaling is configured to indicate the second TCI state identifier for receiving PDSCH scheduled by the DCI signaling and the second TCI state identifier is selected from the second number of TCI state identifiers by the base station, and the DCI signaling is sent to the terminal, thereby achieving the transmission configuration for receiving the PDSCH scheduled by the DCI signaling, and also improving the reliability of the transmission configuration.

As for the apparatus embodiments that basically correspond to the method embodiments, the relevant descriptions thereof may refer to the part of method embodiments. The apparatus embodiments described above are merely illustrative. The units described above as separate components may or may not be physically separated, and the components displayed as units may or may not be physical units, that is, they may be located in one unit, or may be distributed to multiple network units. Some or all of the modules may be selected according to actual needs to achieve the objectives of the solutions of the present disclosure. Those skilled in the art may understand and implement them without creative work.

The present disclosure also provides a non-transitory computer-readable storage medium having a computer program stored thereon. The computer program is used to execute the method for configuring transmission described in any one of FIGS. 1 to 8.

The present disclosure also provides a non-transitory computer-readable storage medium having a computer program stored thereon. The computer program is used to execute the method for configuring transmission described in any one of FIGS. 9 to 14.

The present disclosure also provides a device for configuring transmission, which is a terminal or integrated into a terminal, including a processor and a memory. The memory is configured to store instructions executable by the processor. The processor is configured to receive configuration information for SSB measurement sent by a base station, perform the SSB measurement based on the configuration information for SSB measurement, to obtain an SSB measurement report; and send the SSB measurement report to the base station through a first designated message, to allow the base station to configure a set of TCI states for the terminal based on the SSB measurement report, in which the first designated message is configured to represent contention resolution during a random access procedure.

Figure 31:
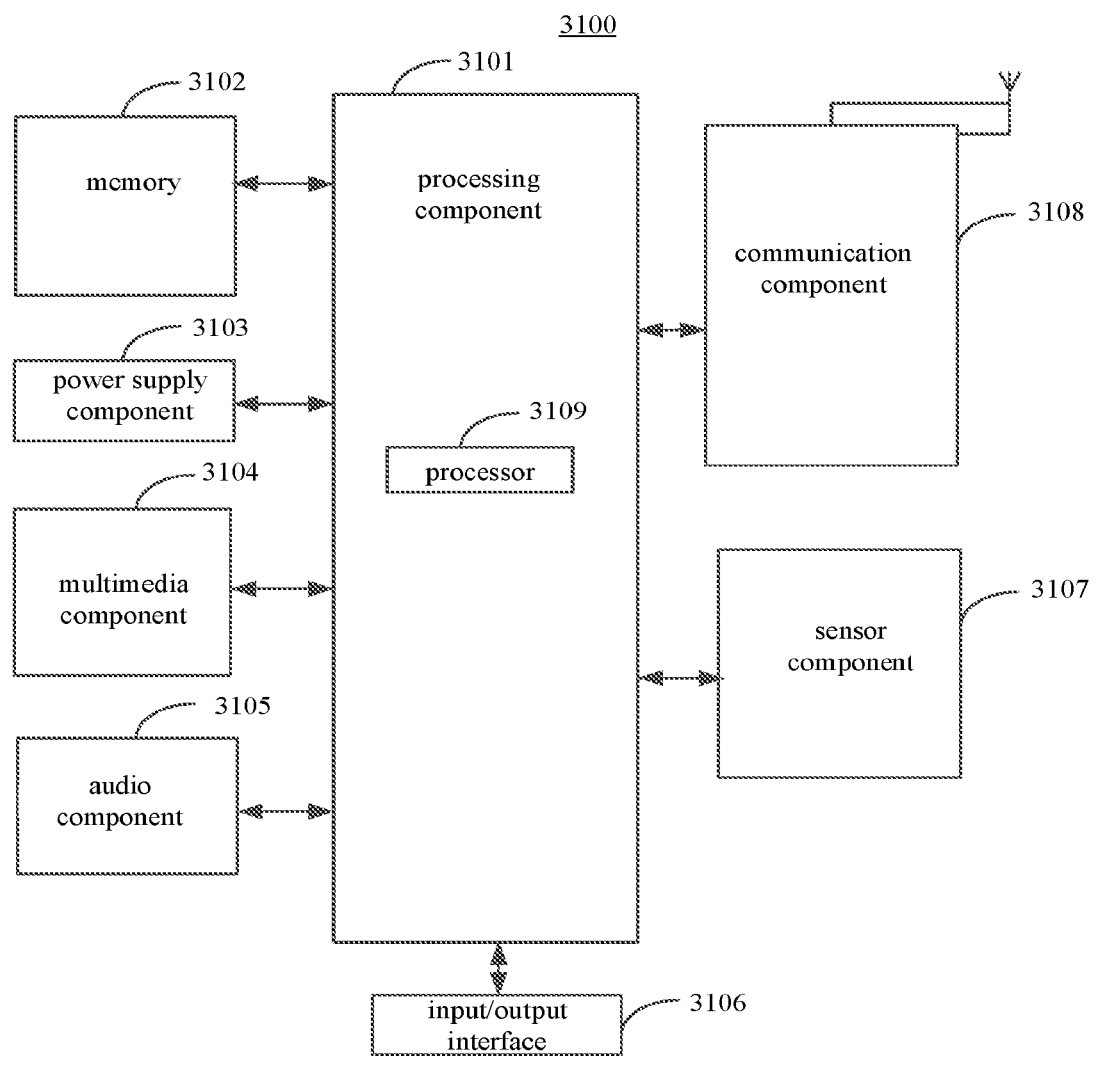
FIG. 31 is a structural schematic diagram illustrating a device for configuring transmission according to an example embodiment.

FIG. 31 is a schematic structural diagram illustrating a device for configuring transmission according to an example embodiment. As illustrated in FIG. 31, an apparatus 3100 for configuring transmission illustrated according to an example embodiment may be a computer, a mobile phone, a digital broadcasting terminal, a message sending and receiving device, a game console, a tablet device, a medical device, a fitness device, a personal digital assistant, and other terminals.

As illustrated in FIG. 31, the apparatus 3100 may include one or more of the following components: a processing component 3101, a memory 3102, a power supply component 3103, a multimedia component 3104, an audio component 3105, an input/output (I/O) interface 3106, a sensor component 3107, and a communication component 3108.

The processing component 3101 generally controls the overall operations of the apparatus 3100, such as operations associated with display, telephone calls, data communications, camera operations, and recording operations. The processing component 3101 may include one or more processors 3109 to execute instructions to complete all or part of the steps of the method described above. In addition, the processing component 3101 may include one or more modules to facilitate the interaction between the processing component 3101 and other components. For example, the processing component 3101 may include a multimedia module to facilitate the interaction between the multimedia component 3104 and the processing component 3101.

The memory 3102 is configured to store various types of data to support the operations of the apparatus 3100. Examples of these data include instructions for any application or method operating on the apparatus 3100, contact data, phone book data, messages, pictures, videos, and the like. The memory 3102 may be implemented by any type of volatile or non-volatile storage device or their combination, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or an optical disk.

The power supply component 3103 provides power to various components of the apparatus 3100. The power supply component 3103 may include a power management system, one or more power supplies, and other components associated with generating, managing and distributing power for the apparatus 3100.

The multimedia component 3104 includes a screen providing an output interface between the apparatus 3100 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense the touches, slides, and gestures on the touch panel. The touch sensors may not only sense a boundary of a touch or slide, but also detect a duration and pressure related to the touch or slide operation. In some embodiments, the multimedia component 3104 includes a front camera and/or a rear camera. When the apparatus 3100 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 3105 is configured to output and/or input audio signals. For example, the audio component 3105 includes a microphone (MIC). When the apparatus 3100 is in an operation mode, such as a calling mode, a recording mode, and a voice recognition mode, the microphone is configured to receive external audio signals. The received audio signals may be further stored in the memory 3102 or sent via the communication component 3108. In some embodiments, the audio component 3105 further includes a speaker for outputting audio signals.

The I/O interface 3106 provides an interface between the processing component 3101 and a peripheral interface module. The peripheral interface module may be a keyboard, a click wheel, a button, and so on. These buttons may include but are not limited to: a home button, a volume button, a start button, and a lock button.

The sensor component 3107 includes one or more sensors for providing the apparatus 3100 with various aspects of state assessments. For example, the sensor component 3107 may detect the opening/closing state of the apparatus 3100 and relative locations of the components. For example, the component is a display and a keypad of the apparatus 3100. The sensor component 3107 may also detect location changes of the apparatus 3100 or a component of the apparatus 3100, a presence or absence of contact between the user and the apparatus 3100, an orientation or an acceleration/deceleration of the apparatus 3100, and temperature changes of the apparatus 3100. The sensor component 3107 may include a proximity sensor configured to detect the presence of nearby objects without any physical contacts. The sensor component 3107 may also include a light sensor, such as a CMOS or CCD image sensor, for use in imaging applications. In some embodiments, the sensor component 3107 may also include an acceleration sensor, a gyroscope sensor, a magnetic sensor, a pressure sensor or a temperature sensor.

The communication component 3108 is configured to facilitate wired or wireless communications between the apparatus 3100 and other devices. The apparatus 3100 may access a wireless network based on any communication standard, such as a Wi-Fi, a 2G or 3G, or a combination thereof. In an example embodiment, the communication component 3108 receives a broadcast signal or broadcast related information from an external broadcast management system via a broadcast channel. In an example embodiment, the communication component 3108 further includes a near field communication (NFC) module to facilitate a short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example embodiment, the apparatus 3100 may be implemented by one or more application specific integrated circuits (ASICs), digital signal processors (DSP), digital signal processing devices (DSPD), programmable logic devices (PLD), Field programmable gate arrays (FPGA), controllers, microcontrollers, microprocessors or other electronic elements to perform the above methods.

In an example embodiment, a non-transitory computer-readable storage medium including instructions is also provided, such as a memory 3102 including instructions which may be executed by the processor 3109 of the apparatus 3100 to complete the method described above. For example, the non-transitory computer-readable storage medium may be a ROM, a random access memory (RAM), a CD-ROM, a magnetic tape, a floppy disk, an optical data storage device, and the like.

The instructions in the storage medium when executed by the processor cause the apparatus 3100 to perform any of the method for configuring transmission described above.

The present disclosure also provides a device for configuring transmission, which is a base station or integrated into a base state, including a processor and a memory. The memory is configured to store instructions executable by the processor. The processor is configured to set configuration information for SSB measurement for a terminal, send the configuration information for SSB measurement to the terminal, to allow the terminal to perform SSB measurement based on the configuration information for SSB measurement to obtain an SSB measurement report; and configure a set of TCI states for the terminal based on the SSB measurement report in response to receiving the SSB measurement report sent from the terminal through a first designated message, in which the first designated message is configured to represent contention resolution during a random access procedure.

Figure 32:
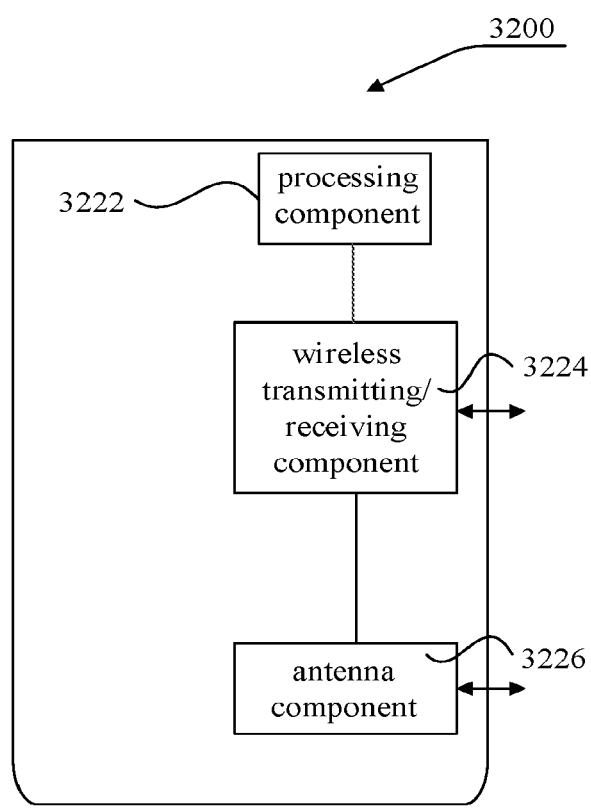
FIG. 32 is a structural schematic diagram illustrating a device for configuring transmission according to an example embodiment.

As illustrated in FIG. 32, FIG. 32 is a structural schematic diagram of a device for configuring transmission according to an example embodiment.

The device 3200 may be provided as a base station. As illustrated in FIG. 32, the device 3200 includes a processing component 3222, a wireless transmitting/receiving component 3224, an antenna component 3226, and a signal processing part specific to a wireless interface. The processing component 3222 may further include one or more processors. One processor in the processing component 3222 may be configured to perform any of the above methods for configuring transmission.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for configuring transmission that is executed by a terminal, the method comprising:
receiving configuration information for synchronization signal block (SSB) measurement from a base station;
performing an SSB measurement based on the configuration information for SSB measurement in order to obtain an SSB measurement report; and
sending the SSB measurement report to the base station through a first designated message in order to allow the base station to configure a set of transmission configuration indication (TCI) states for the terminal based on the SSB measurement report, wherein the first designated message is configured to represent contention resolution during a random access procedure;
wherein the method further comprises:
receiving a second designated message for representing successful contention resolution sent by the base station; and
receiving a radio resource control (RRC) signaling sent by the base station, wherein the RRC signaling includes at least one of a first set of TCI states for receiving physical downlink control channel (PDCCH) or a second set of TCI states for receiving physical downlink shared channel (PDSCH), where the first set of TCI states and the second set of TCI states are configured by the base station for the terminal, the first set of TCI states includes first correspondences between TCI state identifiers for receiving PDCCH and SSB identifiers, the second set of TCI states includes second correspondences between TCI state identifiers for receiving PDSCH and SSB identifiers;
wherein the first set of TCI states includes at least two TCI state identifiers, and the method further comprises:
receiving a first media access control (MAC) control element (CE) signaling sent by the base station, wherein the first MAC CE signaling is configured for activating a first TCI state identifier, and the first TCI state identifier is selected from the first set of TCI states by the base station and configured for allowing the terminal to determine a first receiving beam required for receiving the PDCCH from the base station;
determining a first SSB identifier corresponding to the first TCI state identifier based on the first correspondences; and
using the first receiving beam for receiving the SSB designated by the first SSB identifier or corresponding to the first SSB identifier and receiving the PDCCH.

2. The method of claim 1, wherein receiving the configuration information for SSB measurement from the base station further comprises:
receiving a system message block (SIB)1 from the base station, the SIB1 including the configuration information for SSB measurement.

3. The method of claim 1, wherein the configuration information for SSB measurement further comprises:
a measured object that includes one or more SSBs designated by the base station;
a measurement triggering condition that includes a designated measurement triggering threshold; and
a configuration of the measurement report that includes a designated content of the measurement report.

4. The method of claim 3, wherein sending the SSB measurement report to the base station through the first designated message further comprises:
determining a first designated resource that is configured by the base station for the terminal for transmitting the first designated message;
adding the SSB measurement report to the first designated message; and
sending the first designated message carrying the SSB measurement report to the base station through the first designated resource.

5. The method of claim 3, wherein:
the configuration of the measurement report further includes a designated transmission resource of the measurement report, and
sending the SSB measurement report to the base station through the first designated message further comprises:

determining a second designated resource that is configured by the base station for the terminal for transmitting the first designated message;

obtaining a cell radio network temporary identifier (C-RNTI) when the second designated resource is different from the designated transmission resource, wherein the C-RNTI is the same as the first designated message; and sending the SSB measurement report to the base station through the C-RNTI and the designated transmission resource.

6. The method of claim 5, wherein the method further comprises:

adding the SSB measurement report to the first designated message when the second designated resource is the same as the designated transmission resource; and sending the first designated message carrying the SSB measurement report to the base station through the second designated resource.

7. The method of claim 1, wherein the second set of TCI states includes a first number of TCI state identifiers where the first number is greater than 1, and the method further comprises:

receiving a second MAC CE signaling sent by the base station, wherein the second MAC CE signaling is configured for activating a second number of TCI state identifiers for receiving PDSCH, and the second number of TCI state identifiers is selected from the first number of TCI state identifiers in the second set of TCI states by the base station.

8. The method of claim 7, wherein the second number is greater than 1, and the method further comprises:

receiving a downlink control information (DCI) signaling sent by the base station, wherein the DCI signaling is configured to indicate the second TCI state identifier for receiving PDSCH scheduled by the DCI signaling and the second TCI state identifier is selected from the second number of TCI state identifiers by the base station;

determining a second SSB identifier corresponding to the second TCI state identifier based on the second correspondences; and using a second receiving beam in receiving the PDSCH scheduled by the DCI signaling, wherein the second receiving beam is further used for receiving the SSB designated by the second SSB identifier or corresponding to the second SSB identifier.

9. A method for configuring transmission that is executed by a base station, the method comprising:

setting configuration information for synchronization signal block (SSB) measurement by a terminal;

sending the configuration information for SSB measurement to the terminal in order to allow the terminal to perform an SSB measurement based on the configuration information for SSB measurement to obtain an SSB measurement report; and configuring a set of transmission configuration indication (TCI) states for the terminal based on the SSB measurement report when the SSB measurement report is received from the terminal through a first designated message that is configured to represent contention resolution during a random access procedure;

configuring the set of TCI states for the terminal based on the SSB measurement report further comprises:

configuring at least one of a first set of TCI states for receiving physical downlink control channel (PDCCH) or a second set of TCI states for receiving physical downlink shared channel (PDSCH) for the terminal based on the SSB measurement report, where the first set of TCI states includes first correspondences between TCI state identifiers for receiving PDCCH and SSB identifiers, the second set of TCI states includes second correspondences between TCI state identifiers for receiving PDSCH and SSB identifiers;

wherein the first set of TCI states includes at least two TCI state identifiers, and the method further comprises:

selecting a TCI state identifier from the first set of TCI states as a first TCI state identifier;

generating a first media access control (MAC) control element (CE) signaling that is configured for activating the first TCI state identifier that is configured for allowing the terminal to determine a first receiving beam required for receiving the PDCCH from the base station; and sending the first MAC CE signaling to the terminal, so that the terminal determines a first SSB identifier corresponding to the first TCI state identifier based on the first correspondences and uses the first receiving beam for receiving the SSB designated by the first SSB identifier or corresponding to the first SSB identifier and receiving the PDCCH.

10. The method of claim 9, wherein sending the configuration information for SSB measurement to the terminal comprises:

adding the configuration information for SSB measurement to a system message block (SIB) 1 and sending the SIB 1 to the terminal.

11. The method of claim 9, wherein the configuration information for SSB measurement comprises:

a measured object including one or more SSBs designated;

a measurement triggering condition including a designated measurement triggering threshold; and a configuration of the measurement report including a designated content of the measurement report, or a designated content and a designated transmission resource of the measurement report.

12. The method of claim 9, wherein the method further comprises:

sending a second designated message to represent successful contention resolution to the terminal; and adding the first set of TCI states and/or the second set of TCI states to a radio resource control (RRC) signaling and sending the RRC signaling to the terminal.

13. The method of claim 12, wherein the second set of TCI states includes a first number of TCI state identifiers, in which the first number is greater than 1, and the method further comprises:

selecting a second number of TCI state identifiers for receiving PDSCH from the first number of TCI state identifiers;

generating a second MAC CE signaling that is configured to activate the second number of TCI state identifiers for receiving PDSCH; and sending the second MAC CE signaling to the terminal.

14. The method of claim 13, wherein the second number is greater than 1, and the method further comprises:

generating a downlink control information (DCI) signaling that is configured to indicate the second TCI state identifier for receiving PDSCH scheduled by the DCI signaling and the second TCI state identifier is selected from the second number of TCI state identifiers by the base station; and sending the DCI signaling to the terminal.

15. A device for configuring transmission that is integrated in a terminal, the device comprising:
- a processor; and
- a memory that is configured to store instructions executable by the processor,
- wherein the processor is configured to:
  - receive configuration information for synchronization signal block (SSB) measurement from a base station;
  - perform an SSB measurement based on the configuration information for SSB measurement in order to obtain an SSB measurement report; and
  - send the SSB measurement report to the base station through a first designated message in order to allow the base station to configure a set of transmission configuration indication (TCI) states for the terminal based on the SSB measurement report, wherein the first designated message is configured to represent contention resolution during a random access procedure;
- the processor is further configured to:
- receive a second designated message for representing successful contention resolution sent by the base station; and
- receive a radio resource control (RRC) signaling sent by the base station, wherein the RRC signaling includes at least one of a first set of TCI states for receiving physical downlink control channel (PDCCH) or a second set of TCI states for receiving physical downlink shared channel (PDSCH), where the first set of TCI states and the second set of TCI states are configured by the base station for the terminal, the first set of TCI states includes first correspondences between TCI state identifiers for receiving PDCCH and SSB identifiers, the second set of TCI states includes second correspondences between TCI state identifiers for receiving PDSCH and SSB identifiers;
- wherein the first set of TCI states includes at least two TCI state identifiers, and the processor is further configured to:
- receive a first media access control (MAC) control element (CE) signaling sent by the base station, wherein the first MAC CE signaling is configured for activating a first TCI state identifier, and the first TCI state identifier is selected from the first set of TCI states by the base station and configured for allowing the terminal to determine a first receiving beam required for receiving the PDCCH from the base station;
- determine a first SSB identifier corresponding to the first TCI state identifier based on the first correspondences; and
- use the first receiving beam for receiving the SSB designated by the first SSB identifier or corresponding to the first SSB identifier and receiving the PDCCH.

16. The device of claim 15, wherein the processor is further configured to:
- receive a system message block (SIB)1 sent by the base station, the SIB1 including the configuration information for SSB measurement.

* * * * *